(12) United States Patent
Roccaforte

(10) Patent No.: US 6,778,996 B2
(45) Date of Patent: Aug. 17, 2004

(54) TECHNIQUES FOR INDEXING INTO A ROW OF A DATABASE TABLE

(75) Inventor: Raymond Roccaforte, Los Altos, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 10/435,428

(22) Filed: May 9, 2003

(65) Prior Publication Data

US 2003/0208503 A1 Nov. 6, 2003

Related U.S. Application Data

(63) Continuation of application No. 10/232,581, filed on Aug. 30, 2002, which is a continuation of application No. 09/427,202, filed on Oct. 25, 1999, now Pat. No. 6,484,179.

(51) Int. Cl.$^7$ .............................................. G06F 17/30
(52) U.S. Cl. ...................................... 707/104; 707/101
(58) Field of Search ........................... 707/3, 4, 2, 101, 707/201, 104

(56) References Cited

U.S. PATENT DOCUMENTS

| 5,359,724 | A | 10/1994 | Earle |
| 5,848,408 | A | 12/1998 | Jakobsson et al. |
| 5,905,985 | A | 5/1999 | Malloy et al. |
| 5,918,232 | A | 6/1999 | Pouschine et al. |
| 5,926,818 | A | 7/1999 | Malloy |
| 5,940,818 | A | 8/1999 | Malloy et al. |
| 5,943,668 | A | 8/1999 | Malloy et al. |
| 5,978,788 | A | 11/1999 | Castelli et al. |
| 6,122,636 | A | 9/2000 | Malloy et al. |
| 6,161,105 | A | 12/2000 | Keighan et al. |
| 6,163,774 | A | 12/2000 | Lore et al. |
| 6,189,004 | B1 | 2/2001 | Rassen et al. |
| 6,205,447 | B1 | 3/2001 | Malloy |
| 6,212,515 | B1 | 4/2001 | Rogers |
| 6,212,524 | B1 | 4/2001 | Weissman et al. |
| 6,282,544 | B1 | 8/2001 | Tse et al. |
| 6,295,539 | B1 * | 9/2001 | Isip, Jr. ..................... 707/201 |
| 6,374,235 | B1 * | 4/2002 | Chen et al. ................... 707/2 |
| 6,427,143 | B1 * | 7/2002 | Isip et al. ..................... 707/1 |
| 6,438,562 | B1 * | 8/2002 | Gupta et al. ............... 707/201 |
| 6,446,063 | B1 * | 9/2002 | Chen et al. ................... 707/4 |
| 6,484,179 | B1 | 11/2002 | Roccaforte |
| 2003/0055832 | A1 * | 3/2003 | Roccaforte ................ 707/100 |
| 2003/0208503 | A1 * | 11/2003 | Roccaforte ................ 707/101 |

OTHER PUBLICATIONS

Volker Markl, et al., "Improving OLAP Performance by Multidimensional Hierarchical Clustering," 1999, International Database Engineering and Applications Symposium, Aug. 02–04, 1999, Montreal, Canada, 13 pages.

J. A. Orenstein, et al., "A Class of Data Structures for Associative Searching," 1984, ACM, pp. 181–190.

Oracle Corporation, "Oracle7 MultiDimension, Advances in Relational Database Technology for Spatial Data Management," Mar. 1995, Part #: A30957, pp. 1–31.

* cited by examiner

Primary Examiner—Jean M. Corrielus
(74) Attorney, Agent, or Firm—Hickman Palermo Truong & Becker LLP; John D. Henkhaus

(57) ABSTRACT

According to one aspect, an index that is built on a table having a plurality of rows comprises an index entry that contains a key value for a sub-part of a row and that includes data for locating a row and data for locating, within the row, a value associated with the sub-part of the row. In one embodiment, the sub-part of the row is an array, with each member of the array represented in the row.

13 Claims, 6 Drawing Sheets

FIG. 1
(PRIOR ART)

"STORES" (TABLE 102)

| STORE-ID | MANAGER | CITY | STATE |
|---|---|---|---|
| 1020 | JOHNSON | SAN JOSE | CA |
| ... | ... | ... | ... |
| 5034 | SMITH | NY | NY |

"PRODUCTS" (TABLE 104)

| PRODUCT-ID | SOURCE | PARTS | COST |
|---|---|---|---|
| 960 | HASBRO | 5 | $564 |
| ... | ... | ... | ... |
| 572 | NIKE | 2 | $23 |

"SALES" (TABLE 106)

| AMOUNT | STORE-ID | PRODUCT-ID | DATE |
|---|---|---|---|
| $234.56 | 1020 | 960 | 12/15/95 |
| ... | ... | ... | ... |
| $769.34 | 1020 | 570 | 7/6/96 |

TECHNIQUES FOR INDEXING INTO A ROW OF A DATABASE TABLE

CROSS-REFERENCE TO RELATED APPLICATIONS

This application is a continuation of and claims the benefit of domestic priority under 35 U.S.C. §120 from commonly owned U.S. patent application Ser. No. 10/232,581 filed on Aug. 30, 2002, entitled "Storing Multidimensional Data in a Relational Database Management System", which is a continuation of patent application Ser. No. 09/427,202 now U.S. Pat. No. 6,484,179 filed Oct. 25, 1999, entitled "Storing Multidimensional Data In A Relational Database Management System", both of which are hereby incorporated by reference in their entirety for all purposes, as if fully set forth herein.

FIELD OF THE INVENTION

The present invention relates to relational database management systems and, more specifically, to techniques for indexing into a row of a database table.

BACKGROUND OF THE INVENTION

In the context of database systems, a "dimension" is a list of values that provide categories for data. A dimension acts as an index for identifying values of a variable. For example, if sales data has a separate sales figure for each month, then the data has a MONTH dimension. That is, the data is organized by month. A dimension is similar to a key in a relational database. Data that is organized by two or more dimensions is referred to as "multidimensional data".

Any item of data within a multidimensional variable can be uniquely and completely selected by specifying one member from each of the variable's dimensions. For example, if a sales variable is dimensioned by MONTH, PRODUCT, and MARKET, specifying "January" for the MONTH dimension, "Stereos" for the PRODUCT dimension, and "Eastern Region" for the MARKET dimension uniquely specifies a single value of the variable. Thus, dimensions offer a concise and intuitive way of organizing and selecting data for retrieval, updating, and performing calculations.

Multidimensional data may be stored in relational database systems ("ROLAP" systems) or in specialized, "multidimensional" database systems ("MOLAP" systems). Multidimensional database systems provide structures and access techniques specifically designed for multidimensional data, and therefore provide relatively efficient storage and access to multidimensional data. However, when stored in specialized multidimensional database systems, only applications that are specially built to interact with those multidimensional database systems are able to access and manipulate the data.

On the other hand, when stored in relational database systems, all applications that support interaction with relational databases have access to the data. Such database applications communicate with the relational database system by submitting commands that conform to the database language supported by the relational database system, the most common of which is the Structured Query Language (SQL).

Relational database systems store data in the form of related tables, where each table has one or more columns and zero or more rows. The conventional mechanism for storing multidimensional data in a relational database system is to store the data in tables arranged in what is referred to as a star schema. In relational database systems, a star schema is distinguished by the presence of one or more relatively large tables and several relatively smaller tables. Rather than duplicating the information contained in the smaller tables, the large tables contain references (foreign key values) to rows stored in the smaller tables. The larger tables within a star schema are referred to as "fact tables", while the smaller tables are referred to as "dimension tables". FIG. 1 illustrates an exemplary star schema with two dimensions.

Referring to FIG. 1, it illustrates a database 100 that includes tables 102, 104 and 106. Table 102 is named "store" and contains information about each of the stores in which sales may occur. Each row in store table 102 contains a unique store-id and information about the particular store that corresponds to the store-id. Table 104 is named "product" and contains information about each type of product that may be sold in any of the stores. Each row in product table 104 contains a unique product-id and information about the particular product.

Table 106 is named "sale" and contains information about each sale in each of the stores represented in the store table 102. Each row in sale table 106 includes a dollar amount, a store-id to indicate the store at which the sale was made, a product-id to indicate the product sold in the sale, and the date of the sale. Typically, the number of sales will be vastly greater than both the number of stores at which the sales are made and the number of products carried by the stores. Detailed information about the store and product involved in a sale transaction does not have to be stored in the rows of table 106 because such detailed information is available in tables 102 and 104, respectively. Instead, the rows of table 106 simply contain values (store-ids and product-ids) that reference information stored in the other tables 102 and 104. Therefore, tables 102, 104 and 106 constitute a star schema in which table 106 is the fact table and tables 102 and 104 are dimension tables.

The data stored in fact table 106 only has two dimensions, and therefore fact table 106 only has two columns dedicated to storing foreign key values for those dimensions. In general, a fact table must dedicate one column for storing foreign key values for each of the dimensions associated with the multidimensional data stored in the fact table. Thus, a fact table that stores data associated with twenty dimensions would have to dedicate twenty columns to the storage of foreign key values.

Storing multidimensional data within a relational database has two significant drawbacks. First, the fact table is significantly larger than it would have to be if it only had to store the multidimensional data itself. The massive size of the fact table, relative to the dimension data itself, is largely due to the need to store a foreign key value for each dimension for each multidimensional value. Second, the rows within a conventional fact table have no particular order. Consequently, multidimensional values that are closely related to each other conceptually may be stored relatively randomly throughout the entire fact table. This leads to inefficiencies because multidimensional data that is conceptually related to each other are frequently accessed and manipulated as a group.

An alternative approach to managing multidimensional data in a relational database involves storing the data in relational files but maintaining all multidimensional structure, metadata, administration, and access control using multidimensional database system techniques. Accessing relationally-stored data using multidimensional techniques poses numerous difficulties. For example, when all administration and access to the multidimensional data are controlled exclusively through the multidimensional database system engine, two database management systems must be administered. Further, database applications that access data using conventional relational commands (e.g. SQL commands) are unable to access the multidimensional data.

The approaches described above for storing multidimensional data in relational database systems demonstrate the tradeoffs made by prior approaches, which have either (1) sacrificed the benefits of multidimensional storage to enjoy the benefits of modern relational systems, such as conventional relational access, or (2) sacrificed the benefits of relational storage to attain the efficiency of multidimensional storage.

SUMMARY OF THE INVENTION

Techniques are provided for indexing into a row of a database table. According to one aspect, an index that is built on a table having a plurality of rows comprises an index entry that contains a key value for a sub-part of a row and that includes data for locating a row and data for locating, within the row, a value associated with the sub-part of the row. In one embodiment, the sub-part of the row is an array, with each member of the array represented in the row.

According to one aspect, data within a relational table is located by traversing an index that is built on the table to locate an index entry for a key value that is associated with the data. Data from the first entry is read to identify which row of the table contains data associated with the key value, and data from the first entry is read to locate a sub-part within the row that is associated with the key value. In one embodiment, the index has a second entry for a key value for a second sub-part of the row.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates a star schema;

DETAILED DESCRIPTION OF EMBODIMENTS

Overview-Indexing Into a Row

Figure 2:
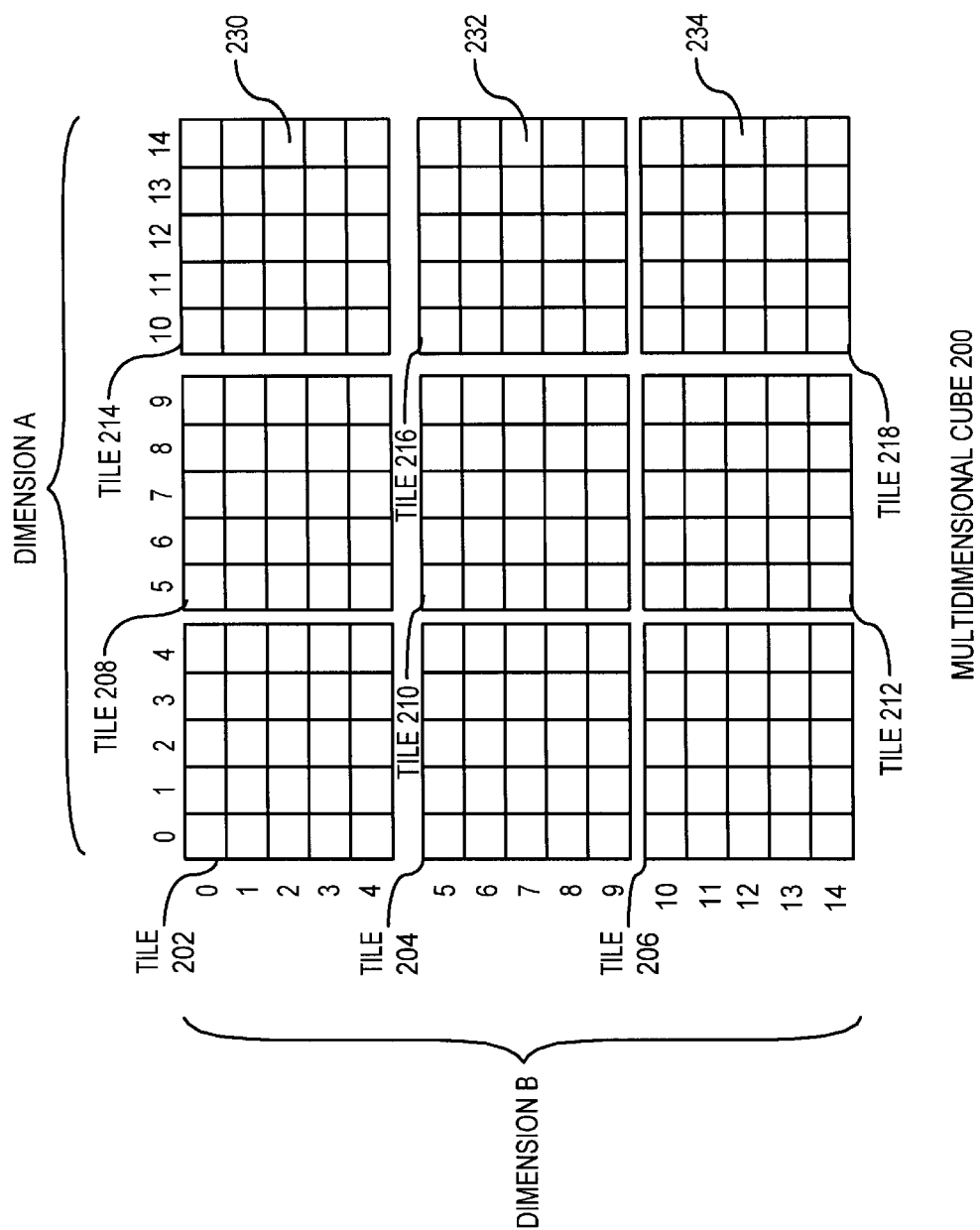
FIG. 2 is a block diagram illustrating a two dimensional cube that has been divided into tiles according to an embodiment of the invention.

Various techniques are provided for generating a replacement value from foreign key values that are associated with multidimensional data in a relational database system and that are mapped to and replaced by a "replacement" value.

In general, the process involves sub-dividing the multidimensional cube that contains all of the multidimensional values into smaller sub-cubes that are referred to as tiles. Each tile has a particular set of coordinates within the larger cube, and each multidimensional value has a particular set of coordinates within the tile to which it belongs. An offset value uniquely identifies a cell within a tile.

Techniques are provided for indexing into a row of a database table. For example, assume a fact table is implemented with rows of the form<tile_number, VARRAY>. In such an embodiment, a rowid uniquely identifies a tile, not a cell value. Thus, to locate the cell value associated with an index entry, the index entry stores, in addition to the rowid of the row that contains the cell value, the offset value for the cell. Once the correct row has been retrieved based on the rowid stored in an index entry, the correct cell value within the row is retrieved based on the offset value stored in the index entry.

According to one aspect, an index that is built on a table having a plurality of rows comprises an index entry that contains a key value for a sub-part of a row and that includes data for locating a row and data for locating, within the row, a value associated with the sub-part of the row. In one embodiment, the sub-part of the row is an array, with each member of the array represented in the row.

Using Replacement Values to Reduce the Size of the Fact Table

According to one aspect of the invention, the many foreign key values of each row in a fact table are replaced by data that is derived from those foreign key values. The derived data that is used to replace multiple foreign key values in a row is referred to herein as a "replacement value". As shall be described in greater detail hereafter, replacement values may include numerous components, but the amount of data contained in a replacement value tends to be significantly less than the amount of data required for the numerous foreign key values that it replaces. Because a replacement value is smaller than the numerous foreign key values it replaces in a row, the size of the row is significantly reduced. A significant reduction in the size of each row of a fact table results in a significant reduction in the size of the fact table itself.

According to another aspect of the invention, rows are stored in the fact table in sorted order. The order in which the rows are sorted is based on the closeness, within a multidimensional cube, of the multidimensional values that belong to the rows. Values that are closely located within a multidimensional cube are likely to be accessed together. Consequently, storing the fact table rows in a way that clusters values that are closely located within a multidimensional cube tends to reduce the I/Os produced during operations that access the fact table.

According to one embodiment, a mapping function is provided that allows the database server to derive a single replacement value from any given combination of foreign key values, and an inverse mapping function is provided to reproduce the combination of foreign key values given the single replacement value. When a new row is to be inserted into the fact table, the mapping function is applied to the foreign key values of the row to produce the replacement value. A modified row that contains the replacement value but not the individual foreign key values from which it was derived is then inserted into the fact table. When it is necessary to determine a particular foreign key value associated with the row, the inverse mapping function is applied to the replacement value stored in the row.

Terminology

Various techniques may be used to generate replacement values from sets of foreign key values. For the purpose of explanation, techniques used to derive replacement values shall be described with reference to the following terms.

"Dimension key values" are the values associated with a particular dimension. For example, the dimension key values for a "region" dimension may be "Northern Region", "Southern Region", "Eastern Region" and "Western Region". In a star schema, the dimension key values of a dimension are typically stored in the dimension key column of the dimension table associated with the dimension.

As mentioned above, any item of data within a multidimensional variable can be uniquely and completely selected by specifying one member from each of the variable's dimensions. Thus, a multidimensional variable can be conceptually thought of as an N-dimensional array, where N is the number of dimensions of the variable, and where each value in the array may be accessed by specifying one dimension key value for each dimension (e.g. MDVar(dim1, dim2, dim3, . . . , dimN)).

Multidimensional arrays with 2 and 3 dimensions may be depicted visually as grids and cubes, respectively. For convenience, it has become customary to refer to the conceptual multidimensional arrays that correspond to multidimensional variables as "multidimensional cubes" or merely "cubes" regardless of how many dimensions they possess. Further, each multidimensional value is said to belong to a "cell" of the cube, where the address of the cell is the set of dimension key values (one per dimension) that correspond to the multidimensional value contained therein. For the purpose of explanation, the multidimensional value that belongs to a cell shall be referred to as the "cell value" of that cell.

While multidimensional values conceptually reside in cells of multidimensional cubes, within a relational database they actually reside in rows of a fact table. According to one embodiment, the relative position of a cell within a cube is used to determine the replacement value for the cell value that conceptually resides in that cell.

Overview of Replacement Value Derivation

According to one embodiment, replacement values are derived by:

(1) dividing a multidimensional cube into "tiles", each of which may encompass numerous cells, (2) assigning tile_position values to the tiles, (3) assigning local_position values to cells within each tile, (4) using the tile_position and local_position values to derive tile_number and offset values, and (5) using tile_number-offset value combinations as the replacement values.

Each of these phases in the replacement value derivation process shall be described in detail hereafter.

Tiles

According to one embodiment of the invention, replacement values are derived by subdividing the multidimensional cube that contains all of the cell values of a fact table into smaller sub-cubes that are referred to herein as tiles. Each tile has a particular set of coordinates within the larger cube, and each cell value has a particular set of coordinates within the tile to which it belongs. Each of the tiles that are produced by subdividing the cube in this manner is assigned a single number, where tiles that are assigned closely related numbers are closely related within the dimensions of the cube.

The tile number of the tile in which a particular cell value resides is then stored as the replacement value in the row that contains that cell value in the fact table, replacing the separate foreign key values that were used to derive that tile number.

Mapping Dimension Key Values to Whole Numbers

According to one embodiment, dividing the dimensional cube into sub-cubes involves the establishment of a one-to-one mapping between the dimension key values of each dimension and "coordinate values". According to one embodiment, the coordinate values are integers beginning at 0. Thus, for a dimension of N dimension key values, the N dimension key values are mapped to integers in the range 0 to N−1. Of course, such a mapping is only necessary when the dimension key values are not themselves integers in the range from 0 to N−1.

Various techniques may be used to establish a one-to-one mapping between dimension key values and whole numbers. For example, assume that N is the cardinality of a particular dimension table. The N dimension key values in the dimension table may be mapped to integers in the 0 . . . N−1 range according to the following rules:

(1) If the dimension key values are integer values in the range from K to L, then mapping the K to L values to 0 . . . N−1 using the function $f(x)=x-K$.

(2) If the dimension key values can be sorted according to some criterion, then an integer from 0 to N−1 can be assigned to each position in the sorted result. The coordinate values 0 to N−1 can be stored in a hidden column in the dimension table. The coordinate mapping is then encapsulated in the relationship between the key column and the hidden column.

(3) If there is no natural way to sort the dimension key values, then the mapping can be done arbitrarily by the relational database system, or based on data supplied by the user. When assigned in this manner, the coordinate values may still be stored in a hidden column in the dimension table.

When each of the dimensions have been mapped to a set of coordinates, any item of data within a multidimensional variable can be uniquely and completely selected by specifying one coordinate value from each of the variable's dimensions. For example, assume that a multidimensional variable has the dimensions MONTH, REGION, and PRODUCT. A particular item X may be selected by specifying MONTH=4, REGION=10, and PRODUCT=12.

Orientation

According to one embodiment, an order is assigned to the dimensions of a cube, and the dimension to which a particular coordinate value corresponds is indicated by the order in which the coordinate value is specified. For example, assume that the dimensions MONTH, REGION, PRODUCT are assigned the order <region, month, product>. Based on this ordering, item X may be selected by specifying <10, 4, 12>.

A particular ordering applied to a set of dimensions is referred to herein as an "orientation". Thus <region, product> and <product, region> describe two different orientations. As shall be described in greater detail hereafter, the orientation is used for navigating the cells of the cube.

Dividing a Cube into Tiles

According to one embodiment, a multidimensional cube is divided into tiles based on coordinate value ranges, where each tile is given a range of coordinate values for each dimension. For example, FIG. 2 shows a multidimensional cube 200 that has two dimensions A and B. Dimension A has 15 dimension key values that have been mapped to coordinate values 0 to 14. Dimension B also has 15 dimension key values that have been mapped to coordinate values 0 to 14. Dimension A has been divided into three ranges of 5 values: [0 . . . 4], [5 . . . 9] and [10 . . . 14]. Similarly, dimension B has been divided into three ranges of 5 values: [0 . . . 4], [5 . . . 9] and [10 . . . 14].

Multidimensional cube 200 has been divided into nine tiles 202, 204, 206, 208, 210, 212, 214, 216 and 218, each of which corresponds to a unique combination of coordinate ranges, with one coordinate value range per dimension. For example, tile 202 corresponds to the coordinate value range combination A [0 . . . 4] B[0 . . . 4]. Similarly, tile 216 corresponds to the coordinate value range combination A[10 . . . 14] B[5 . . . 9].

Tile Positions

When a cube has been divided into tiles, each tile resides at a certain position in the cube relative to the other tiles. The position of a tile within a cube, relative to the other tiles, is referred to herein as the tile_position of the tile. The tile_position of a tile includes one "tile coordinate value" for each dimension. For example, assume that the orientation of cube 200 is Dimension A, Dimension B. Tiles 202, 208 and 214 therefore correspond to tile_positions <0,0>, <1,0>, and <2,0>, respectively. Similarly, tiles 206, 212 and 218 correspond to tile_positions <0,2>, <1,2>, and <2,2>, respectively.

Local Cell Positions

The position of a cell relative to the tile in which the cell resides is referred to as the "local_position" of the cell. For any given cell, the local_position includes one coordinate value for each of the dimensions of the tile in which the cell resides. For example, each tile in cube 200 has two dimensions: dimension A and dimension B. Consequently, the local_position of a cell that belongs to a tile of cube 200 will consist of a coordinate value for dimension A and a coordinate value for dimension B. However, the coordinate values of a local_position designate the position of a cell relative to the other cells in the same tile, not the position of the cell within the entire cube. Thus, cells 230, 232 and 234 have the same local_position, even though they reside at different tiles and at different "global" coordinates within the cube 200.

When the multidimensional cube has been divided into tiles, individual cells may be selected based on the tile_position that uniquely identifies the tile in which the cell is located, and the local_position that uniquely identifies the location of the cell within the tile. Therefore, tile_position-tile_position combinations may be used as replacement values. Specifically, a tile_position-local_position combination may be used to replace, in each row of the fact table, the foreign key values associated with a cell value of that row.

Deriving Tile_Position-Local_Position Combinations

According to one embodiment of the invention, a <tile_position, local_position>combination is derived for a cell value by first determining the global coordinates of the cell to which the cell value belongs (based on the dimension key value to coordinate value mappings), and then applying the following equations:

Given a cell that resides at global coordinate position (x1, . . . , xN)

tile_position=(q1, . . . , qN) where qi=xi DIV Ti local_position=(r1, . . . , rN) where ri=xi MOD Ti.

In both equations, Tj is the number of dimension key values spanned along dimension j by a tile.

For example, the global coordinates of cell 230 in cube 200 of FIG. 2 are <14, 2>. Cube 200 is divided into tiles of 5×5. Thus, Ti for both dimensions A and B is 5. Therefore, the tile_position for cell 230 is <14 DIV 5, 2 DIV 5>or <2, 0>. The local_position for cell 230 is <14 MOD 5, 2 MOD 5> or <4, 2>. The tile_position-local_position combination for cell 230 is therefore (<2,0><4,2>).

Tile_Number-Offset Combinations

Each of tile_position and local_position is an N-tuple of coordinate values, where N is the number of dimensions of the cube. Thus, a tile_position-local_position combination consists of 2N coordinate values. For example, if N is 10, then each tile_position-local_position combination would include twenty coordinate values. The amount of space required store 2N coordinate values in each row of the fact table may be still be significant. Therefore, according to one embodiment of the invention, tile_number values that are smaller than the tile_position values are derived from tile_position values, and offset values that are smaller than the local_position values are derived from local_position values. Thus, every tile_position-local_position combination may be reduced to a tile_number-offset combination. The tile_number-offset combinations are then used as the replacement values within the fact table. Techniques for respectively deriving tile_number values from tile position values and offset values from local_position values shall be described hereafter in greater detail.

Deriving Tile_Number Values from Tile_Position Values

According to one embodiment, the tile_position N-tuple that uniquely identifies a tile is reduced to a single value, referred to herein as the tile_number of the tile, according to the equation:

tile_number=sum($N-1$, 1, $p1^* \ldots {}^*pj^*q[j+1]$)+$q1$+1 where qj=jth tile_position coordinate (as above), pj=number of pages along dimension j j=(select count (distinct id) from Dim[j])DIV Tj+r/max(r, 1), with r=(select count (distinct id) from Dim[j]) MOD Tj.

The notation sum(A, B, expr[j]) denotes the sum of expr[j] from j=A to j=B.

The equation given above assigns a particular order to the tiles within a cube. That order corresponds to a particular traversal pattern of the cube. Different traversal patterns, that would result in a different tile numbering scheme, can be achieve using other equations. The present invention is not limited to the use of any particular cube traversal pattern to establish the tile_number values, and therefore is not limited to any particular equation for establishing tile_number values. Preferably, the particular traversal pattern used by an implementation is selected in a way that assigns closely related tile_number values to tiles that are located near each other in the multidimensional cube. Assigning closely related tile_number values to closely located tiles improves clustering in implementations where the rows of the fact table are sorted by tile number, as shall be described in greater detail hereafter.

Deriving Offset Values from Local_Position Values

According to one embodiment, the local_position N-tuple that uniquely identifies a cell within a tile is reduced to a single value, referred to herein as the offset of the cell, according to the equation:

$$\text{offset} = \text{sum}(N-1, 1, T1^* \ldots {}^*Tj^* \; r[j+1]) + r1 + 1, \text{ where } rj = xj \bmod Tj.$$

The equation given above assigns a particular order to the cells within a tile. That order corresponds to a particular traversal pattern of the tile. Other equations would correspond to different traversal patterns. The present invention is not limited to the use of any particular tile traversal pattern to establish the offset values of cells, and therefore is not limited to any particular equation for establishing offset values. Preferably, the particular traversal pattern used by an implementation is selected in a way that assigns closely related offsets to cells that are located near each other in the multidimensional tile. Assigning closely related numbers to closely located cells improves clustering in implementations where the rows of the fact table are sorted by tile_number-offset, as shall be described in greater detail hereafter.

Deriving Dimension Key Values from Tile_Number-Offset Combinations

The size of a fact table may be reduced by not storing in the fact table the dimension key values that are associated with each cell value. According to one embodiment, tile_number-offset combinations are stored in the fact table in place of the foreign key values. However, the cell values within fact tables are frequently accessed based on dimension key values. To access fact table data based on dimension key values, it is necessary to determine the dimension key values that are associated with the cell values stored in the fact table.

According to one embodiment, the process of determining the dimension key values associated with a cell value stored in the fact table is the inverse of the process that is used to derive the tile_number-offset combinations that are stored in the fact table. Specifically, a tile_position-local_position combination is derived from the tile_number-offset combination associated with a cell value. The global coordinates of the cell associated with the cell value are then derived from the tile_position-local_position combination. The dimension key values associated with the cell value may then be determined based on the mapping between the global coordinate values and the dimension key values.

For example, assuming that the equations given above are used to derive the tile_number values and offset values of a cell, the tile position of the cell may be derived by the equation:

For $j=N$ down to $2\{qj=(\text{tile\_number}-1)DIV \; p1^* \ldots {}^*p[j-1]-\text{sum}(k=j+1,N,pj^* \ldots {}^*p[k-1]^*qk)\}$, where $q1$ is solved using the tile_number equation specified previously.

The local_position of the cell may be derived by the equation:

For $j=N$ down to $2\{rj=(\text{offset}-1)DIV \; T1^* \ldots {}^*T[j-1]-\text{sum}(k=j+1, N, Tj^* \ldots {}^*T[k-1]^*rk)\}$, where $r1$ is solved using the offset equation specified previously.

The global coordinates of the cell may then be derived from the tile_position-local_position combination by the equation:

$$xj = Tj^*qj + rj.$$

Increasing Clustering Within the Fact Table

According to one embodiment of the invention, the mapping function used to generate the replacement values is selected such that the foreign key value combinations of cell values that are conceptually related to each other map to replacement values that are close to each other. The rows in the fact table are then stored within the fact table in a sorted order, where the replacement values are used as the sort key. Because the replacement of each row generally reflects the position of the cell value in that row relative to the multiple dimensions, sorting the fact table based on the replacement values causes cell values that are conceptually related to each other to be stored physically near each other within the fact table.

For example, in embodiments that use tile_number-offset combinations as replacement values, the cell values in closely located cells will frequently be in the same tile, and therefore have the same tile_number. By maintaining the fact table in a sorted order, where the tile_number is used as the sort key, rows that contain cell values that belong to the same tile will be stored close to each other. Further, if tile_number-offset combinations are used as the sort key, then each cell value within a tile will be stored close to the other cell values within the same tile that are most closely related to it.

Tile Size Selection

According to one embodiment of the invention, the size of tiles is selected based on the characteristics of the storage device on which multidimensional data is stored. Specifically, in one embodiment, the size of tiles into which a cube is divided is selected so that all data for a single tile fits within one disk block. For example, assume that the storage device storing a fact table whose rows contain the multidimensional data has a disk block size of 4K bytes. Further assume that each row of the fact table in (replacement value, cell value) format consumes 40 bytes. Under these conditions, one hundred rows of the fact table would be able to fit within a disk block. Thus, a tile size of 100 cells may be selected. The actual dimensions of a 100-cell tile may vary depending on how the cube is to be divided. For example, a two dimensional cube may be divided into 100-cell tiles that are 4×25, 5×20, 10×10, etc. Similarly, a three dimensional cube may be divided into 100-cell tiles that are 4×5×5, 5×10×2, 10×10×1, etc.

By storing the data that belongs to a tile in a single disk block, data retrieval becomes more efficient. Specifically, when an operation requires one data item from a tile to be retrieved, there is a relatively high likelihood that other data items from that same tile will be needed in the near future. Upon the retrieval of the data item, the entire disk block containing the data item is loaded into volatile memory. Consequently, when other data items from the same tile are subsequently required, they may be retrieved from volatile memory without causing additional disk accesses.

In some systems, such as systems that support multi-block I/O, it may be desirable to select a tile size that holds more data than can fit on a single disk block. According to one embodiment, disk block size is still taken into account when selecting such larger tile sizes. In particular, larger tile sizes are selected so that the data contained therein fits on a particular number of disk blocks. For example, if 100 fact table rows fit on each disk block, then a tile size of N cells is selected, where N is a multiple of 100. In a system that supports I/O of 10 blocks at a time, a tile size of 1000 cells would still allow all values of a tile to be loaded into volatile memory with a single I/O operation.

Fact Table Storage Format

While the techniques described above allow cell values to be stored in a fact table based on the tile_number-offset combinations, the actual format of such fact tables may vary from implementation to implementation. For example, in one embodiment, each cell value is stored in its own row of the fact table. In such an embodiment, each row may have the form <tile_number, offset, value>, where "value" is the cell value associated with a particular cell, tile_number is the number of the tile that contains the cell, and offset is the offset value for the cell within that tile. Fact tables that store information in this form are referred to herein as row-per-cell tables, because the fact table includes one row for each populated cell in the multidimensional cube associated with the fact table. When row-per-cell format is used, redundant tile_number values may be compressed out at the data layer.

In other embodiments, each row of a fact table may be used to store all of the values to reside in a tile. Fact tables that store a single row for all values within a tile are referred to herein as row-per-tile tables. The format of a row in a row-per-tile table may be, for example <tile_number, VARRAY>, where VARRAY is an array of the cell values contained in a particular tile. Specifically, VARRAY would have the form <cell_value1, cell_value2, . . . cell_valueN>where N is the number of cells within a tile. The position of the cell values within VARRAY corresponds to the offset of the cell values.

In sparsely populated tiles, many of the cell values may be NULL. Rather than store, within each row, VARRAYs that include many NULLs, rows may be stored in the form <tile_number, <offset1, value1>,<offset2, value2>. . . >where an offset-value pair is only supplied for those cells that are actually populated.

According to another embodiment, "clusters" can be used. In such an embodiment, the "cluster key" may be the grid position of a multidimensional sub-cube this implementation is similar to the row-per-cell embodiment described above, with the "cluster key" corresponding to the <tile_number, offset>pair.

Index-Only Tables

According to another embodiment of the invention, the fact table may be stored as an Index Only Tables (IOT) rather than as a conventional relational table. An index-only table is similar to a conventional table with an index on one or more of its columns. However, an index—only table differs from a standard table in that instead of maintaining two separate data containers for the table and its index, the database server only maintains a single index with no actual base table.

As with conventional tables, clients manipulate index-only tables by submitting statements to the database server in the database language supported by the database server. However, all operations on the data in the table are performed by manipulating the corresponding index.

Each entry in the index for an index-only table contains both the encoded key value and the associated column values for the corresponding row. That is, rather than having a row identifier in the index entry, the actual data from the corresponding row is stored in the index. Thus, every index entry for an index-only table has the form <primary_key_value, non_primary_key_column_values>.

Index-only tables are suitable for accessing data via primary key or via any key which is a valid prefix of the primary key. Also, there is no duplication of key values as only non key column values are stored with the key.

When combined with the techniques described herein, index-only tables may store multidimensional data using the tile_number as the primary key.

Integration With Partitions

According to one embodiment, the tiling techniques described herein are combined with partitioning techniques to produce substantial advantages in populating the cube, performance, and reduction of problems associated with sparsity.

According to one embodiment, new data is added to the fact table associated with a cube in a way that takes advantage of partitioning. Specifically, most data warehousing customers use the "rolling window" operational scheme enabled by key-range or composite partitions. In this scheme, each key-range partition can be treated as an independent unit and tiled independently. The latest partition's data is added to the warehouse as follows:

1) load or insert the data into a table, tiling it according to the desired sub-cube scheme;

2) exchange the table into a partition of the fact table.

In the above mode of operation, the number of time dimension key values in any particular partition is fixed. Thus, the last dimension in the orientation can be allocated to the second most frequently changing non-time dimension (e.g., product). The advantage is that coordinate values do not have to be pre-allocated beyond the existing range for the product dimension as it is the last dimension in the orientation.

Sparsity

A multidimensional cube that has many empty cells (cells for which no value has been entered) is referred to as a sparsely populated cube. Even when a cube itself is not sparsely populated, certain tiles within the cube could be. According to embodiments of the invention, cell data is stored in relational tables. In row-per-cell tables, rows are only allocated for cells for which values have been entered. In row-per-tile tables, rows are only allocated for tiles that contain at least one populated cell. In a row-per-tile table, the row for a sparsely populated tile may store null values for each cell in the tile that is unpopulated, as mentioned above.

Alternatively, rows of a row-per-tile table may store values for only the cells that are populated, as described above. To identify the cells that correspond to the cell values stored in a row, the row stores an offset with each cell value. Thus, the format of a fact table row would be <tile_number, <offset1, cell_value1><offset2, cell_value2>. . . <offsetN, cell_valueN>>, where N is the number of populated cells in the tile identified by tile_number.

The techniques described herein address the classical sparsity problems plaguing conventional MOLAP storage schemes. For example, consider a cube with product, region, and time dimensions. The data for each month may be handled as a separate cube, where each month-based cube is tiled independently of the other month-based cubes. When a new product is added at time T, there are no sales for that product for dates before T and hence empty cells are introduced into the cube. This is a substantial problem in a conventional MOLAP scheme which must compress these cells out of the storage representation. The techniques described herein handle this in a much more efficient way. If a new product is introduced in April, the April cube partition is simply one product "taller" than previous cube partitions. No sparsity is introduced.

Although in this representation the cube inherits additional structure and is organized as a collection of disjoint sub-cubes, it is in fact a single table from the point of view of administration and query access.

Using these techniques, large performance gains can be realized for multidimensional queries since they can take advantage of partition-pruning, which ensures that only partitions which can possibly contain part of the solution set are accessed.

Adding Values to a Dimension

Figure 3:
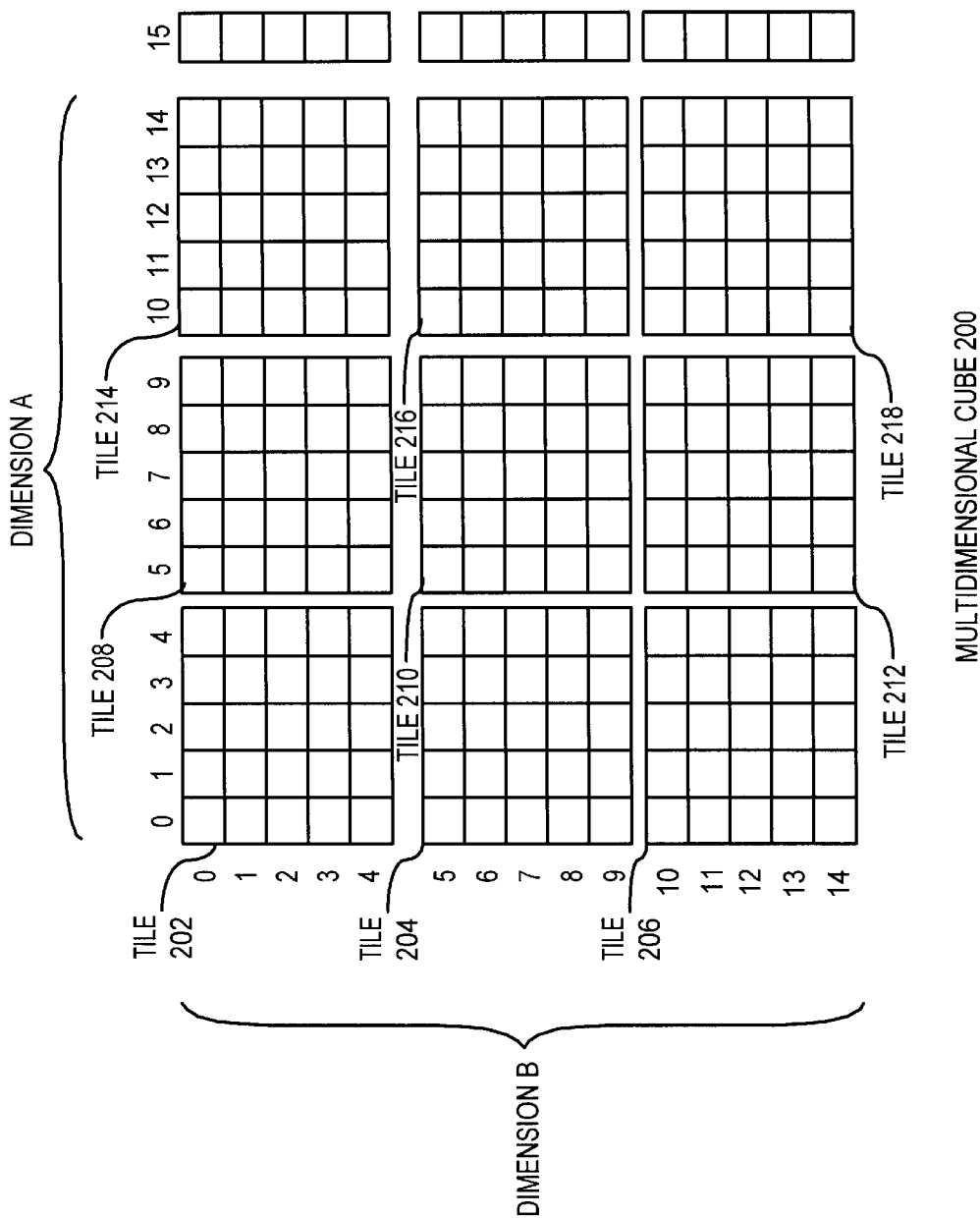
FIG. 3 is a block diagram illustrating the cube of FIG. 2 after new dimension key values have been added to dimension A of the cube.

When new values are added to a dimension, the cube is effectively extended in the direction of that dimension. For example, assume that a sixteenth value is added to dimension A of cube 200 shown in FIG. 2, and that that new value is mapped to coordinate value 15. This would effectively add a new column 302 of cells to cube 200, as illustrated in FIG. 3. Unfortunately, the cells that belong to that new column 302 do not belong to any existing tiles. However, to store the rows associated with those cells in the fact table in the same manner as all of the existing rows (i.e. with <tile_number, offset>instead of foreign key values), those cells must be assigned to tiles.

Various techniques may be used to ensure that the cells that correspond to newly added dimension key values belong to tiles. According to one technique, the cube may be constructed with a greater number of coordinates in a dimension than the actual number of dimension key values currently stored in that dimension. For example, assume that dimension A of cube 200 has only 10 dimension key values. Rather than establish cube 200 with 10 coordinates in dimension A, cube 200 is established with 15 coordinates in dimension A. Ten of the 15 coordinate values are mapped to the ten existing dimension A values. The remaining five coordinate values do not currently map to any existing dimension A value. Those five coordinate values referred to herein as "pre-allocated" coordinate values, since allocated for the purpose of tiling the cube, but do not actually correspond to any dimension key values. The column of cells associated with each of the pre-allocated coordinate values will not contain any cell values, since no fact table row will have a dimension A value that maps to the coordinate values of those columns.

When a new dimension key value is added to dimension A, the dimension key value is mapped to one of the five pre-allocated coordinate values. When rows associated with the new dimension A value are added to the fact table, those rows will correspond to cells that already exist in a particular tile of the cube. Consequently, a tile_number and offset may be generated for the rows, and stored in the fact table as the replacement values for the rows.

If all of the pre-allocated coordinate values for a dimension have been used, then there will be no coordinate value to assign to a new dimension key value in that dimension. Under those circumstances, an entirely new cube, with a new set of tiles, may be established for the fact table.

Various techniques may be employed to add new dimension key values without having to re-organize the data. In general, new dimension key values are added "at the end" of the coordinate range, which avoids the necessity of re-organizing the data. Examples of techniques of adding new dimension key values include:

1. New time dimension key values can be added by using partitions. Each partition can be separately tiled thus completely avoiding any re-organization issues.
2. The "last" dimension in the defined orientation can always accept new dimension key values without any re-organization of data or re-numbering of tiles.
3. For dimensions other than the "last" dimension in the orientation, coordinate values can be pre-allocated to accommodate the necessity of adding dimension key values in the future. Pre-allocation has no effect on performance or the multidimensional organization since the associated cells will simply not be stored (due to the nature of the relational system). New dimension key values can then be added up to the pre-allocation limit without any reorganization or re-numbering of tiles.
4. New dimension key values can be added past the pre-allocation limit to dimensions other than the "last" dimension in the orientation without re-organizing the data, but the tiles will have to be re-numbered. Thus, there is some expense to this operation, although it is still far less expensive than actually shuffling data among the data blocks.

Preferably, schema designers will put any rapidly changing dimension (such as time) as the last dimension in the orientation to avoid tile re-numbering when adding new dimension key values.

Metadata

Various items of information are maintained as metadata by systems that implement the techniques described herein. Typically, this metadata will reside in a system dictionary. Depending on the implementation, the metadata may include (1) coordinate mapping for the dimension key values for each dimension, (2) orientation of the dimensions, and (3) the width Tj of a tile along each dimension. Note Tj is the number of dimension key values from dimension j per tile (end tiles excepted).

Clustering and Compression

Relative to conventional techniques for storing multidimensional data within a relational database, the techniques described herein provide both improved clustering and reduced storage size. Specifically, the technique both clusters the data (by grouping/sorting the rows according to the tile_number) and compresses it (as a single tile_number replaces what would be the dimension key values associated with each individual cell in the tile).

However, certain embodiments may implement the clustering aspects of the techniques without implementing the compression aspects of the techniques. Similarly, other embodiments may implement the compression aspects of the techniques without implementing the clustering aspects of the techniques. For example, clustering may be achieved without compression by sorting the rows of the fact table by corresponding <tile_number, offset>, while leaving each row of the fact table in its original relational form (i.e. with all dimension key values). Compressing the foreign key values into replacement values can then be achieved as a separate step. If the compression step is performed at the data layer, then the entire scheme will be completely transparent to the SQL layer of the relational engine, greatly easing the implementation.

Alternatively, compression may be achieved without clustering by storing replacement values in the fact table in place of dimension key values, but not maintaining the fact table in any particular sorted order. Such an embodiment would avoid the overhead associated with maintaining the fact table in sorted order at the expense of clustering.

Embodiments that implement both the compression and clustering aspects of the techniques, and which store fact table rows in the form <tile_number, cell_value1, cell_value2, . . . cell_valueN>, are referred to herein as "combined" embodiments. Embodiments that implement only the compression aspect of the techniques or only the clustering aspect of the techniques shall be referred to herein as "separable" embodiments.

Query Interface

The techniques described herein allow for typical SQL and ROLAP applications to execute queries against a compressed/clustered fact table without source-code changes, but enables greater performance due to the size reduction and multidimension organization of the fact table.

Typical ROLAP queries that access fact tables have the form:

| | |
|---|---|
| SELECT d1_id, . . . , dN_id, m1, . . . , mK | |
| FROM fact, d1, . . . , dN | |
| WHERE fact.d1_id = d1.d1_id and | <Join Predicates> |
| fact.d2_id = d2.d2_id . . . | |
| AND d1 BETWEEN a AND b | <Filters> |
| AND d2 BETWEEN c and d . . . | |
| GROUP BY d1, . . . , dN | <Group-by keys> |

In the separable clustering-only embodiment of the invention, all objects appear as conventional relational tables to the SQL layer of the relational database management system ("RDBMS") and the query obtains the benefits of the multidimensional organization without any special considerations at the SQL layer of the RDBMS.

In the combined embodiment of the invention, issues at the SQL layer of the RDBMS must be addressed. Specifically, the join predicates present an issue for the combined embodiment of the invention in that the columns fact.d1_id, . . . , fact.dN_id do not really exist. They have been "compressed out" of the fact table as the typical primary-foreign key relationships between dimension and fact tables have been replaced by a mapping of dimension key values to coordinates and then to the position of the measures within the tiling scheme. In order that the query be parsed and an execution plan successfully generated, metadata is kept in the dictionary indicating that the mapping exists so that the join predicates can be interpreted accordingly.

Typically, the execution plan for such a query will be the same as a star query semijoin execution plan, albeit with greater performance due to fewer I/Os against the fact table.

The same considerations and advantages apply to more general ROLAP queries where the select-list items refer to arbitrary dimension table columns rather than the dimension key column.

If bitmap indexes on the fact table corresponding to the dimension key columns have not been created, then the execution plan will use table scans with filters, as described hereafter.

Table Scan

In the separable, clustering-only embodiment of the invention, table scans execute in the conventional way. In the combined embodiment of the invention, special considerations apply. As each page of the fact table is read, cell values are extracted and for each cell value, its <tile_number, offset>pair is mapped back to coordinates (x1, . . . , xN) using the inverse mapping techniques described above. This results in rows of the form (x1, . . . , xN, measure1, . . . , measureM). Predicates can then be applied. The predicates are expressed in terms of the coordinates rather than the values appearing in the query text. The coordinate values used for the predicates are obtained at compile time of the query by mapping the dimension key values in the query to coordinate values.

Index Creation

In the separable clustering-only embodiment of the invention, indexes are created in the conventional way. In the combined embodiment of the invention special considerations apply. For example, assume that the fact table is implemented as an ordinary table with rows of the form <tile_number, VAR RAY>with repeating tile_number values compressed out. In such an embodiment, a rowid uniquely identifies a tile, not a cell value. To locate the cell value associated with an index entry, the index entry stores, in addition to the rowid of the row that contains the cell value, the offset value for the cell. Once the correct row has been retrieved based on the rowid stored in the index entry, the correct cell value within the row is retrieved based on the offset value stored in the index entry.

Some of the indexes created on the fact table may be built with dimension key values as the index keys. However, those dimension key values appear only in the dimension tables and not in the fact table. Under these conditions, the cells are read, and for each cell the rowid and <tile_number, offset>combination is obtained. The <tile_number, offset>pair is mapped back into the cell grid position (x1, . . . ,xN). If necessary, a join back to the dimension table is performed to get the dimension key value. The <dimension_key_value, rowid>pairs are sorted and the index built. This technique may be used for both Btree and bitmap indexes.

It is not necessary to join back if the user has specified a dense range of dimension key values. In this case, the max and min can be kept in the dictionary and the mapping of any coordinate value back to the dimension key values is a trivial calculation based on the mapping of the range <min, . . . , max>onto <0, . . . , N−1 >.

The indexing techniques described herein can be introduced without changing the conventional CREATE INDEX syntax, even though the dimension key columns do not really exist in the fact table. The data dictionary contains the information associating the dimension table column with the name corresponding to the column name specified in the create index statement so that the statement can proceed and execute as just described.

Integration with the Cube Operator

The techniques described herein, via a simple modification of the mappings introduced above, allows for a compact representation of the output of the CUBE operator. The cube operator can be thought of as taking the output produced by the SQL GROUP BY operator and producing from it a logical cube of the same dimension but with one additional coordinate value along each dimension. If the coordinate system introduced in the techniques described herein is simply shifted by 1 along each dimension, the result is a coordinate grid for this new cube. This is achieved by adding a new value, "all", to each dimension key column and having it correspond to the coordinate value 0 along that dimension of the tiling. The equations discussed herein can then be applied directly to this "extended cube", yielding an efficient storage representation previously unavailable.

Retrieval of the additional aggregated values produced by the CUBE operator are straightforward. Consider the query SELECT region sum(sales) FROM c
WHERE region="E"
GROUP BY region.

This query may be transformed internally into the query

SELECT region sum(sales) FROM c
WHERE region="E"
AND model=all,
and the retrieval would be achieved by ANDing the bitmaps corresponding to the predicates to get the matching rowid.

Hierarchy-Defined Tilings

In the techniques described above, it was assumed that, along any given dimension, all tiles had a fixed width. Fixed-width tiles are accomplished by (1) mapping each dimension key value to a coordinate value, and (2) subdividing each dimension into coordinate value ranges of equal size. The ranges into which a particular dimension is divided for the purposes of tiling the cube are referred to herein as the "tiling ranges" of that dimension.

Because each tiling range covers an equal number of coordinate values, and coordinate values correspond to dimension key values, each tiling range covers an equal number of dimension key values. When the cube is subdivided in this manner, the boundaries between the tiling ranges of a dimension are entirely dictated by (1) the dimension-value-to-coordinate-value mapping and (2) the fixed width selected for that dimension, without respect to any logical relationships between the dimension key values in that dimension. The ordering used to perform the dimension-value-to-coordinate-value mapping may have very little to do with logical relationships between dimension key values. For example, if the dimension key values are city names, then the dimension-value-to-coordinate assignments may be made in alphabetical order. Thus, Anchorage (Ark.) and Apopka (Fla.) may fall into the same tiling range, even though the cities have little in common, while Anchorage and Wrangell (Ark.), which are logically related, do not.

When the dimension key values that fall into a tiling range have little logical relationship with each other, the benefits achieved by clustering fact table rows based on tile membership are diminished. For example, assume that city names are mapped to coordinates based on alphabetical order, and that fact table rows are stored in order based on tile membership. If a query requests data for all cities in particular state, the query is likely to require data from as many data blocks as it would if the fact table rows were not ordered at all.

However, if hierarchical relationships have been defined along any of the dimensions, they define a natural granularity for tiling along those dimensions, and many queries would benefit from improved performance if the cells within each hierarchically-defined granule can be stored together.

For example, one dimension of a multidimensional cube may be "geography", where geography has the following levels: city, state, region, country. Of these levels, "city" has the finest granularity, where each city value corresponds to a single cell of the cube. The level of a hierarchical dimension in which dimension key values map to individual cells is referred to herein as the "finest" level. All other levels in the hierarchy are referred to as "non-finest" levels.

If the geography dimension is subdivided into fixed width tiling ranges, then all individual tiles will be associated with the same number of city-level dimension key values. However, the city-level dimension key values that are associated with a single tile may correspond to cities that belong to many different states. Conversely, many states may have their data spread across multiple tiles. Because a cell value that corresponds to a particular city is likely to be accessed with cell values for other cities in the same state, it would be beneficial to have cell values for all cities within a given state fall into a single tiling range.

According to one embodiment, techniques are provided for implementing a scheme by which cell values which are naturally-related through a hierarchical structure will be stored together, and can thus be retrieved with a minimal number of I/Os. Moreover, the hierarchy-defined tiling techniques can be combined with fixed-width tiling techniques to produce a mapping which yields benefits when the tile widths are fixed along some dimensions and variable along others.

According to one approach, the cube is subdivided along a hierarchical dimension based on the dimension key values of a non-finest level of the hierarchical dimension. In the "geography" example, a particular non-finest level of the geographic dimension, such as "state", may be selected, and the cube may be subdivided along that dimension based on the mapping between city-level cells and state-level dimension key values. Unlike fixed-width tiles, tiles created in this manner have a variable width along the dimension.

Figure 4A:
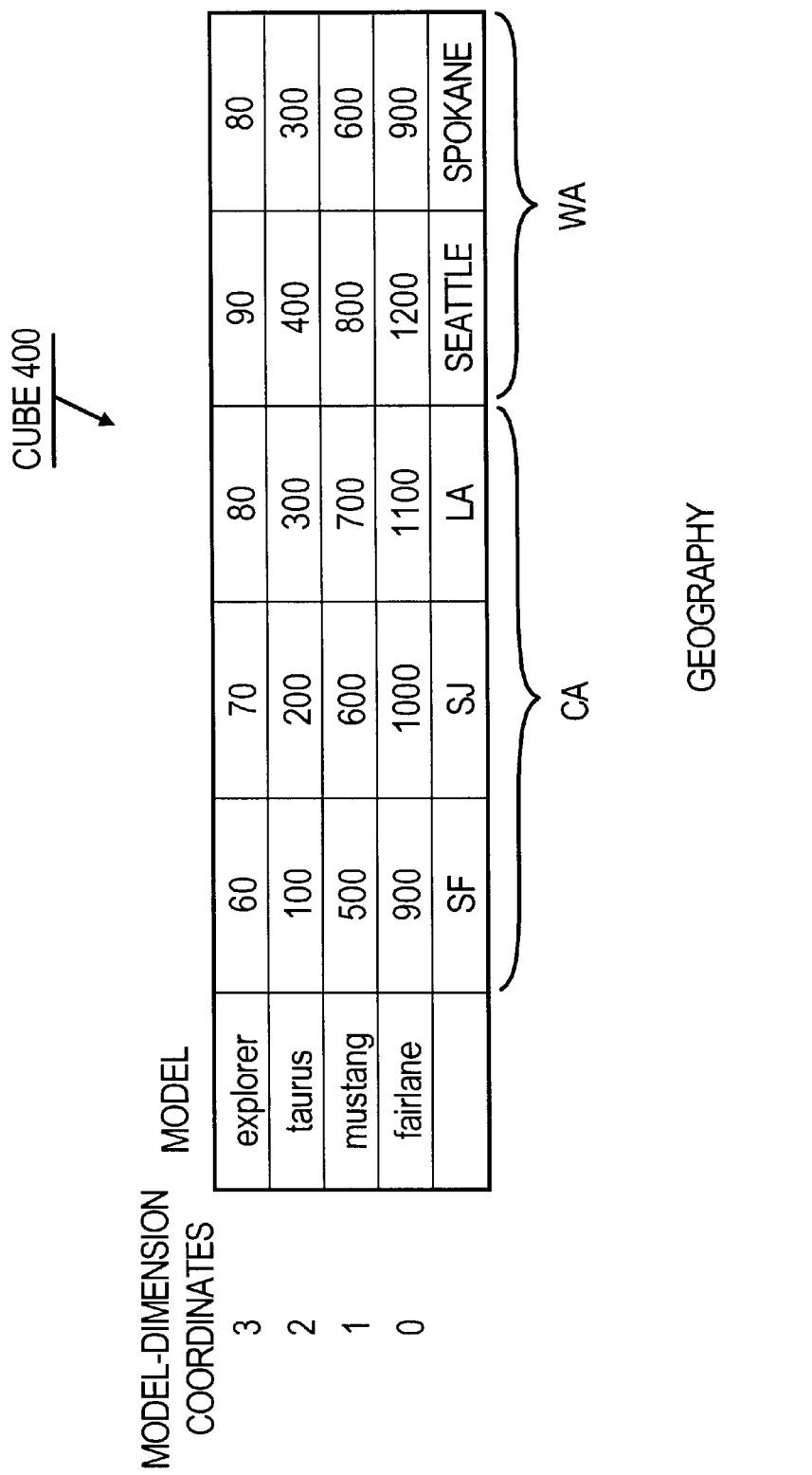
FIG. 4A is a block diagram illustrating a cube with a hierarchical dimension.

To illustrate the use of hierarchy-defined tiling, consider cube 400 illustrated in FIG. 4A, which contains sales data by model and city. City is the finest-level of the hierarchical dimension "geography". Another level of that hierarchy is "state". The database system maintains a mapping from city-level dimension key values to state-level dimension key values. This mapping may be stored, for example, in the geography dimension table, where the geography dimension table rows have the form: <ID, CITY_VALUE, STATE_VALUE, . . . >The geography dimension table associated with cube 400 would therefore contain the following rows:

<1, SF, CA, . . . >
<2, SJ, CA, . . . >
<3, LA, CA, . . . >
<4, SEATTLE, WA, . . . >
<5, SPOKANE, WA, . . . >

In the example shown in FIG. 4A, the city values "SF", "SJ" and "LA" map to the state value "CA", and the city values "SEATTLE" and "SPOKANE" map to the state value "WA".

To divide cube 400 into tiles, the hierarchical dimension "geography" may be divided based on the non-finest level "state". Thus, instead of dividing cube 400 into tiles that have an equal number of city values, cube 400 is divided into tiles based on the state values. Specifically, the tiling ranges of the geography dimension are established based on the mapping between city values and state values, where all cities that map to the same state value belong to the same tiling range.

Figure 4B:
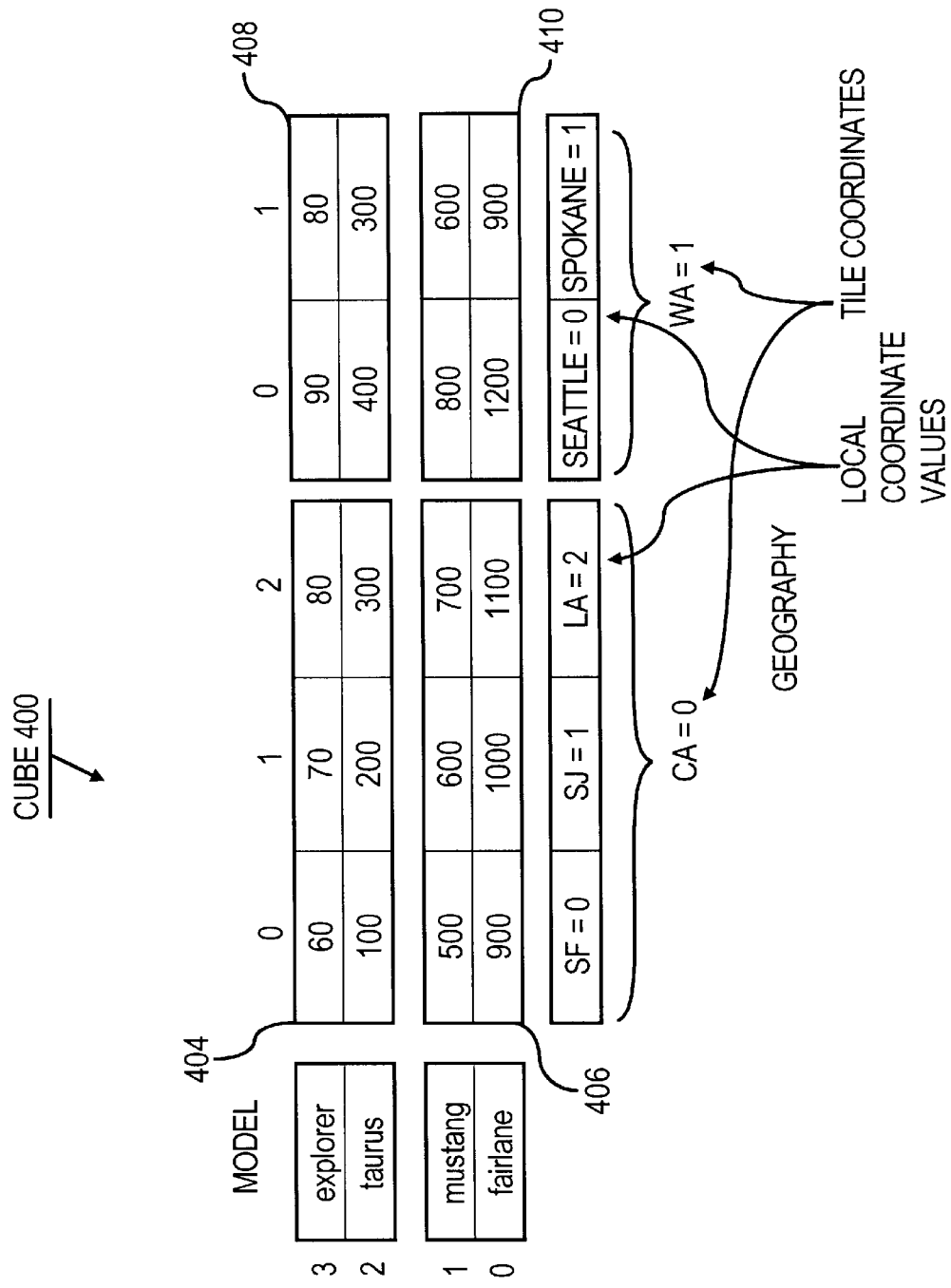
FIG. 4B is a block diagram illustrating how the cube of FIG. 4 may be tiled based on a members of a particular level of a hierarchical dimension.

FIG. 4B illustrates how cube 400 may be divided into four tiles 404, 406, 408 and 410, where the state-level values are used to establish the tiling ranges of the "geography" dimension. In the present example, all city values that map to CA are established as one tiling range, and all city values that map to WA are established as another tiling range.

Tile Coordinates for Hierarchical Dimensions

As mentioned above, tile_position values are N-tuples of tile coordinate values, with one tile coordinate value for each dimension. If a dimension is divided into fixed width tiling ranges, then the tile coordinate value for that dimension corresponds to a particular range of global cell coordinate values. In contrast, when a dimension is divided into tiling ranges based on the dimension key values of a non-finest level of that dimension, the tile coordinate value in that dimension corresponds to a set of one or more non-finest dimension key values.

Referring to FIG. 4B, each dimension key value in the selected non-finest dimension has been assigned a tile coordinate. In particular, the dimension key value "CA" is assigned tile coordinate 0, and the dimension key value "WA" is assigned tile coordinate 1. Each dimension key value at the selected non-finest level corresponds to a set of dimension key values at the finest level. For example, "CA" maps to SF, SJ and LA, and "WA" maps to SEATTLE and SPOKANE. Cube 400 is divided along the geography dimension in a way that corresponds to those sets of dimension key values. Since those sets of dimension key values do not necessarily have the same number of members, the tiles will not necessarily have the same width relative to that dimension.

Local Positions for Hierarchical Dimensions

As mentioned above, the local_position of a cell indicates the location of the cell relative to other cells within the same tile. A local_position includes one coordinate value for each dimension of the tile. According to one embodiment, the coordinate values for a hierarchically-tiled dimension are established by assigning local coordinate values to the finest-level dimension key values of the hierarchical dimension. For example, in FIG. 4B, the city-level dimension key values in tiling range 0 (the tiling range associated with "CA") are SF, SJ and LA. These city level dimension key values have been respectively assigned local coordinate values of 0, 1, and 2. Similarly, the city-level dimension key values in tiling range 1, SEATTLE and SPOKANE, have respectively been assigned local coordinate values 0 and 1.

The tile coordinate assignments and local coordinate value assignments for a hierarchical dimension may be stored in the dimension table for that dimension. For example, the "geography" dimension table may have the form:

<ID, CITY_VALUE, STATE_VALUE, TILE_COORDINATE, LOCAL_COORDINATE, . . . >The geography dimension table associated with cube 400 would therefore contain the following rows:

<1, SF, CA, 0, 0, . . . >
<2, SJ, CA, 0, 1, . . . >
<3, LA, CA, 0, 2, . . . >
<4, SEATTLE, WA, 1, 0, . . . >
<5, SPOKANE, WA, 1, 1, . . . >

Deriving Replacement Values in Cubes that have Hierarchically-Defined Tiling Ranges When one or more dimensions are divided using hierarchically defined tiling ranges, tile_number-offset combinations may still be used as replacement values in the fact table. However, different techniques are used to derive tile_number-offset combinations from foreign key values, and to derive foreign key values form tile_number-offset combinations.

According to one embodiment, the tile_number-offset combinations are derived by (1) determining coordinates for each dimension key value;

(2) determining tile_position-local_position values based on coordinate values; and (3) determining tile_number-offset values based on tile_position-local_position values.

Deriving Local_Position Values in Cubes that have Hierarchically-Defined Tiling Ranges Local_position values include one local coordinate value for each dimension. For dimensions with fixed-width tiling ranges, the global coordinate value associated with a particular dimension key value is determined by the dimension key value-to-global coordinate value mapping. The local coordinate value for that dimension may then be derived from the global coordinate value and the selected fixed width, as described above.

For example, assume that the foreign key values specified in a query are "Taurus, SJ". Taurus is a dimension key value for the Model dimension, which has been divided into fixed-width tiling ranges, where the fixed width is 2. The global coordinate value assigned to the dimension key value "Taurus" is 2. Assuming that the following equation is used for deriving local coordinates:

$$\text{local\_position}[j]=rj=xj \text{ MOD } Tj.$$

the local coordinate for Taurus is (2 MOD 2)=0.

For dimensions with hierarchy-based tiling ranges, the local coordinate value associated with a particular dimension key value is simply the local coordinate value that has been assigned to that particular dimension key value. According to one embodiment, the local coordinate value for each dimension key value in a hierarchy-tiled dimension is stored in the dimension table row for that dimension key value. Therefore, the local coordinate value for a dimension key value may be obtained simply by reading the appropriate dimension table row.

In the present example, the dimension table row for "SJ" is:

| |
|---|
| <2, SJ, CA, 0, 1, . . . > |

The local coordinate value specified in that row is "1". Therefore, assuming an orientation of <model, geography>, the local_position for "Taurus, SJ" is <0,1>.

Deriving Tile_Position Values in Cubes that have Hierarchically-Defined Tiling Ranges Similar to local_position values, tile_position values include one coordinate value for each dimension. However, in the case of tile_position values, the coordinate values are "tile coordinate values" which indicate the position of a tile relative to other tiles in a cube.

As explained above, the tile coordinate value for a dimension that uses fixed-width tile ranges may be computed by the equation:

$$\text{tile\_position}[j] = qj = xj \text{ DIV } Tj$$

where Tj is the tile width (the number of dimension key values spanned along dimension j by a tile—end tiles excluded).

In the present example, "Taurus" is a dimension key value for the "model" dimension, which has be divided using fixed-width tile ranges, where the fixed width is 2. Thus, the tile coordinate value associated with Taurus may be computed as 2 DIV 2=1.

For dimensions with hierarchy-based tiling ranges, the tile coordinate value associated with a particular dimension key value is simply the tile coordinate value that has been assigned to the non-finest dimension key value to which that particular dimension key value maps. For example, SJ maps to CA, so the tile coordinate value of SJ is the tile coordinate value assigned to CA. According to one embodiment, the tile coordinate value for each dimension key value in a hierarchy-tiled dimension is stored in the dimension table row for that dimension key value. Therefore, the tile coordinate value for a dimension key value may be obtained simply by reading the appropriate dimension table row.

In the present example, the dimension table row for "SJ" is:

| |
|---|
| <2, SJ, CA, 0, 1, . . . > |

The tile coordinate value specified in that row is "0". Therefore, assuming an orientation of <model, geography>, the tile_position for "Taurus, SJ" is <1,0>.

According to one embodiment, for hierarchy-tiled dimensions, the dimension table is constructed with a compound dimension key consisting of <tile_position, local_position>, rather than embedding the position information in additional columns. Thus, the compound dimension key for the geography table associated with cube 400 could have the form <state_code, city_code>. With this approach, the position information is embedded in each row, which obviates the necessity of reading the dimension table when mapping each row.

Deriving Tile_Number Values in Cubes that have Hierarchically-Defined Tiling Ranges According to one embodiment, tile_number values may be derived from tile_position values using the following equation:

$$\text{tile\_number} = \text{sum}(N-1, 1, p1^* \ldots {}^*pj^*q[j+1]) + q1 + 1$$

where qj=jth tile_position coordinate (as above), $pj$ = number of pages along dimension $j$ = (select count (distinct id) from $Dim[j]$ DIV $Tj + r/\max(r, 1)$, with r=(select count (distinct id) from Dim[j]) MOD Tj, along dimensions j with fixed-width tiling ranges, and pj=select count (distinct id_parent_col) from Dim[j], along dimensions j with variable-width tiling ranges.

Thus, along dimensions whose tile-widths are determined by the hierarchical relationships, the number of tiles is also so determined. In particular, the number of tiles is simply the number of distinct values of the parent attribute.

Deriving Offset Values in Cubes that have Hierarchically-Defined Tiling Ranges According to one embodiment of the invention, offset values are derived from local_position values using the equation:

$$\text{offset} = \text{sum}(N-1, 1, T1^* \ldots {}^*Tj^*r[j+1]) + r1 + 1,$$

where rj=xj MOD Tj with Tj is defined as above along dimensions with fixed-width tiles. Along dimensions where the tile width is determined by the hierarchical structure, rj is simply read from the dimension table, and Tj=select count (distinct id) from Dim[j] where parent=(select parent from Dim[j] where id='key_value').

In our example above, for the tile containing 'SF', T1=select count (distinct city) from region where state=(select state from region where city='SF . . . )=3, and T2=2.

Deriving Foreign Key Values in Cubes that have Hierarchically-Defined Tiling Ranges In many operations, it is necessary to derive dimension key values based on tile_number-offset values. According to one embodiment, that derivation is performed by first deriving tile_position-local_position values from the tile_number-offset values, and then deriving the dimension key values from the tile_position-local_position values.

According to one embodiment, tile_position is derived from tile_number according to the equation:

$$\text{For } j=N \text{ down to } 2\{qj=(\text{tile\_number}-1)DIV\, p1^* \ldots {}^*p[j-1]-\text{sum}(k=j+1,N,pj^* \ldots {}^*p[k-1]^* qk)\}$$

where q1 is derived using the equation for tile_number, described above.

Local_position values are derived from offset values according to the equation:

$$\text{For } j=N \text{ down to } 2\{rj=(\text{offset}-1)DIV\, T1^* \ldots {}^*T[j-1]-\text{sum}(k=j+1, N,Tj^* \ldots {}^*T[k-1]^*rk)\},$$

where r1 is derived using the equation for offset, described above.

Along dimensions with fixed tile widths, the global coordinate values associated with dimension key values may be derived using the equation:

$$xj=Tj*qj+rj.$$

The global-coordinate-value-to-dimension-value mapping may then be used to identify the corresponding dimension key values.

Along dimensions where the tile width is determined by the hierarchical relationship, the dimension key values have not been assigned global coordinates. Instead the (tile_position, tile_position) pair serves as the "global coordinates" and from them the dimension key can be obtained from the dimension table.

Multi-Level Tilings

According to another tiling approach, the tiles themselves may be subdivided into smaller tiles. This creates a hierarchy of tiles, where the subdividing criteria used for one level of tile may be completely different than the criteria used for subdividing the tiles at a different level.

Specifically, where a tiling is defined by hierarchical relationships, it is possible to have nested or "multi-level" tilings of L levels where L is the number of levels in the defining hierarchy. For example, if the hierarchy is "city determines state determines region", then an "outer" tiling may be established at the region granule and within each region can be established a sub-tiling at the state level. The fact table rows may then be stored in sorted order based on these tiling levels. Specifically, all rows that correspond to the same region are clustered together, and within each region cluster, all rows that correspond to the same state are clustered together.

Using multi-level tiling techniques, a query asking for all cities in CA can be satisfied with a minimum number of I/Os, and also a query asking for all states in the Pacific region can be satisfied with a minimum number of I/Os. In other words, the techniques described herein extends the I/O optimizations to multiple levels—in this example to the state level and the region level.

For simplicity, equations are provided only for the case where the number of levels of tiling is the same along all dimensions. All dimensions will have the same number of tiling levels, for example, by setting the number of levels of the tiling to be the minimum number of hierarchy levels from among the dimensions defining the cube. For example, if a cube has three dimensions, and the dimensions have 3, 4 and 5 levels, then each of the dimensions may be divided into a 3-level tiling scheme.

Exemplary Cube

For the purpose of explanation, reference shall be made to the following cube ("C1"):

| Japan | Toyota | Lexus | 100 | 200 | 300 | 400 | 500 | 600 | 700 |
|---|---|---|---|---|---|---|---|---|---|
| Japan | Toyota | Camry | 500 | 600 | 700 | 800 | 900 | 1000 | 1100 |
| Japan | Honda | Accord | 100 | 200 | 300 | 400 | 500 | 600 | 700 |
| Japan | Honda | Prelude | 60 | 70 | 80 | 90 | 80 | 90 | 100 |
| USA | Chevy | Corvette | 600 | 700 | 800 | 900 | 1000 | 800 | 900 |
| USA | Ford | Explorer | 100 | 200 | 300 | 400 | 300 | 400 | 500 |
| USA | Ford | Mustang | 500 | 600 | 700 | 800 | 600 | 700 | 800 |
| USA | Ford | Taurus | 900 | 1000 | 1100 | 1200 | 900 | 200 | 300 |
| | | | SF | SJ | LA | Seattle | Denver | Boulder | Tucson |
| | | | Ca | Ca | Ca | Wa | Co | Co | Ar |
| | | | P | P | P | P | We | We | We |

Cube C1 contains sales data by model and city, and has hierarchical relationships defined whereby city determines state determines region, and model determines maker determines manufacturing nation.

To implement multi-level tiling, various techniques may be used to assign coordinate values to finest-level dimension key values.

According to one technique, referred to herein as the "compound key" technique, each dimension table can be constructed with an L-column compound key where L is the number of hierarchy levels, with entries in the form:

<tile_position[L], . . . , tile_position[1]> where tile_position[L] ranges from 0 to number of distinct entries in the highest level of the hierarchy, tile_position[L−1] ranges from 0 to the number of elements in level L−1 mapping to the same value in level L, etc. For example, using this technique on cube C1, the region dimension would be constructed with the compound key having the form:

<region_code, state_code, city_code> and the product dimension would be constructed with the compound key having the form:

<nation_code, manufacturer_code, model_code>.

According to another technique, referred to herein as the "sorted tuple" technique, the (dimension key, parent, . . . , parent) tuples can be sorted according to some criterion and an integer tuple assigned to the sorted result. This integer tuple is stored in hidden columns in the dimension table. The coordinate mapping is then encapsulated in the relationship between the (dimension key, parent, . . . , parent) tuple and the associated hidden columns. Using this technique, mapping each new row requires accessing the dimension tables to translate the (dimension key, parent, . . . , parent) column values to positions. If the dimension table is not too large, a reference table could be cached in memory.

For the purpose of illustration, it shall be assumed that coordinates are assigned using the sorted tuple technique, described above. Using this technique, the "region" dimension table associated with cube C1 would look like the following. The labels q[1][1], etc., will be explained below.

|        | q[1][1] |     | q[2][1] |    | q[3][1] |
|--------|---------|-----|---------|----|---------|
| SF     | 0       | CA  | 0       | P  | 0       |
| SJ     | 1       | CA  | 0       | P  | 0       |
| LA     | 2       | CA  | 0       | P  | 0       |
| Seattle| 0       | WA  | 1       | P  | 0       |
| Denver | 0       | Co  | 0       | We | 1       |
| Boulder| 1       | Co  | 0       | We | 1       |
| Tuscon | 0       | Ar  | 1       | We | 1       |

The "model" dimension table would look like:

|          | q[1][2] |       | q[2][2] |       | q[3][2] |
|----------|---------|-------|---------|-------|---------|
| Taurus   | 0       | Ford  | 0       | USA   | 0       |
| Mustang  | 1       | Ford  | 0       | USA   | 0       |
| Explorer | 2       | Ford  | 0       | USA   | 0       |
| Corvette | 0       | Chevy | 1       | USA   | 0       |
| Prelude  | 0       | Honda | 0       | Japan | 1       |
| Accord   | 1       | Honda | 0       | Japan | 1       |
| Camry    | 0       | Toyota| 1       | Japan | 1       |
| Lexus    | 1       | Toyota| 1       | Japan | 1       |

Deriving Replacement Values Based on Multi-Level Tilings

When a multi-level tiling scheme is performed based on an L-level hierarchy of all dimensions, then the <tile_position, local_position> combination associated with a cell, as described above, is replaced by an N-tuple <tile_position[L], . . . , tile_position[1]>, where tile_position[1] is analogous to the "local_position" used in single-level tiling schemes. With this enumeration, a 1-level tiling is the trivial tiling: each tile consists of a single cell. This corresponds to a 1-level hierarchy being the trivial hierarchy where each member determines only itself.

Deriving Tile-Position N-Tuple

According to an embodiment that employs multi-level tiling, coordinate values for each dimension have the form <Tile_Position[L]. . . . , Tile_Position[2], Tile_Position[1]>. According to one embodiment, for any tiling level k, the Tile_Position[k]=<q[k][1], q[k][2 ], . . . , q[k][N]>, where N is the number of dimensions. The tile position "coordinates" along each dimension are embedded in the dimension tables.

Alternatively, using the compound key technique, q[k][j] would simply be keys in the row to be tiled. For example, <q[2][1], q[2][2]>=<state_code, manufacturer_code>.

Deriving Tile_Number N-Tuple

According to one embodiment of the invention, in a multi-level tiling scheme, tile_number N-tuples <Tile_Number[L], . . . , Tile_Number[1]> are derived from tile position N-tuples. <Tile_Position[L], . . . , Tile_Position[1]> according to the equation:

$$\text{For } k=1, \ldots, L: \text{tile\_number}[k] = \text{sum}(N-1, 1, p[k][1]^* \ldots ^*p[k][j]^*q[k][j+1]) + q[k][1]+1$$

where q[k][j]=position along dimension j of the tile at tiling-level k p[k][j]=number of pages along dimension j at tiling level k, which may be determined by issuing the query:

select count (distinct level_k_col) from Dim[j] where level_k+1_col=(select level_k+1_col from Dim[j] where level_k_col='key_value').

To avoid accessing the dimension table every time a p[k][b] must be determined, the p[k][j] can be computed once and stored in memory for the duration of the calculation.

Deriving Tile_Position N-Tuple from Tile_Number N-Tuple

For certain operations, it is necessary to determine the actual dimension key values associated with a row based on the tile_number tuple stored in the row. According to one embodiment, the dimension key values associated with a row are derived by, (1) deriving a tile_position tuple from the tile_number N-tuple, and (2) determining the dimension key values based on the tile_position N-tuple. According to one embodiment, Tile_Number[k] is converted to Tile_Position[k] according to the equation:

$$\text{For } j=N \text{ down to } 2\{q[k][j] = (\text{tile\_number}[k]-1) DIV\ p[k][1]^* \ldots ^* p[k][j-1] - \text{sum}(n=j+1, N, p[k][j]^* \ldots ^*p[k][n-1]^*q[k][n])\},$$

where q[k][1] is solved using the equation previously described.

The tile position vector N-tuple serves as "coordinates" of the dimension key values, and from them the dimension key values can be obtained from the dimension table.

Hardware Overview

Figure 5:
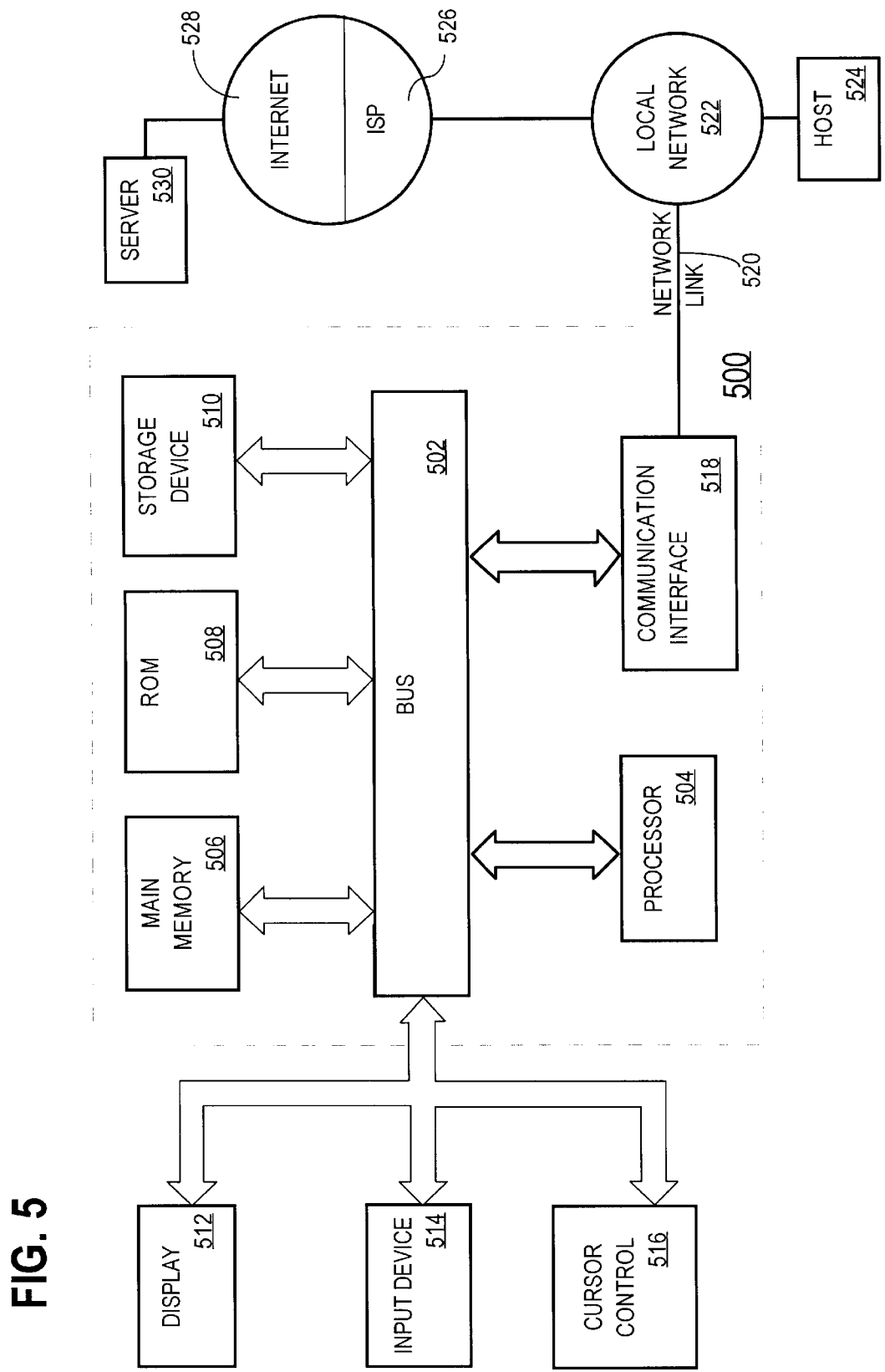
FIG. 5 is a block diagram illustrating a computer system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are implemented by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application implements the techniques described herein.

The received code may be executed by processor 504 as it is received, and/or stored in storage device 510, or other non-volatile storage for later execution. In this manner, computer system 500 may obtain application code in the form of a carrier wave.

Benefits and Advantages

The techniques described herein provide numerous benefits. For example, the techniques described herein organize multidimensional data in such a way as to reflect its multi-dimensional character and associated performance benefits, but the underlying storage, administration, and access mechanisms can remain strictly relational, thus combining the advantages of multidimensional and relational systems.

In addition, the techniques described herein can be used to take advantage of star query semijoin techniques. Further, the present techniques provides critical advantages over the classical relational star schema concept by compressing repeated dimension key values, and providing clustering that can dramatically reduce I/Os in typical multidimensional queries.

Because the relational interface to the data is preserved, existing ROLAP applications will continue to work unchanged while obtaining all the benefits associated with multidimensional data organization. In addition, the techniques described herein allow creation of bitmap (or btree) indexes on a fact table whose dimension key columns which are represented only in an associated dimension table. Consequently, star query processing techniques are preserved, even while they accrue the benefit of dramatically reduced I/O to the fact table due to the multidimensional organization and compression.

The techniques described herein introduce into a relational schema the notion of "coordinates" which contain the information to locate corresponding measures in a relational fact table. In various embodiments, the primary-foreign key relationship between dimension and fact tables is replaced by a mapping of the dimension key values onto the coordinates. This mechanism allows the dimension key values to be compressed out of the fact table, reducing storage and I/O requirements.

The techniques described herein introduce the concept of a "performance-symmetric orientation" of the dimensions describing the cube. The orientation may be used for navigating the cells of the cube. The orientation introduced by these techniques is performance-symmetric in that it treats aggregations along any ordering of the dimensions equally, which results in much more consistent performance than any previous method.

The techniques described herein introduce a complete description of the multidimensional cube in terms of its dimensions. Specifically, dimensions are used to describe the multidimensional and geometric aspects of the cube, and lead to a true embedding of the cube in the relational system and all the associated performance benefits.

The techniques described herein may be combined with partitioning techniques to obtain advantages in populating the cube, sparsity reduction, and improved performance.

The techniques described herein define a compact multidimensional representation of the output of the SQL CUBE operator in a relational system, as well as a way of accessing the extended aggregations computed by the operator (over and above those computed by the base GROUP BY).

Further, the hierarchical tiling techniques described herein store together cells which are naturally related, in that the cells contained in a granule (tile) are defined by the hierarchical relationships in the schema. Thus, data which is "related" (e.g., all cities in CA) can be retrieved with a minimal number of I/Os to the fact table.

The techniques described herein handle variable width tiles along each dimension in addition to the fixed-width tiles. Thus, the techniques can be effectively in multidimensional environments where hierarchical relationships along dimensions are common and provide a natural variable-width tiling scheme.

The multi-level tiling techniques described herein store together cells which are naturally related, in that they are contained in a granule (tile) as defined by the hierarchical relationships in the schema, and it does so at multiple levels. Thus, data which is "related" (e.g., all cities in CA) can be retrieved with a minimal number of I/O's to the fact table, and this optimization applies at multiple levels. For instance, if the hierarchy is (city determines state determines region) then not only can "all cities in CA" be retrieved with a minimal number of I/O's, but so can "all states in the Pacific region".

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-readable medium storing an index that is built on a table that has a plurality of rows, said index comprising:

an index entry that contains a key value for a sub-part of a row of said plurality of rows, said index entry including first data for locating said row; and second data for locating, within said row, a value associated with said sub-part of said row.

2. The computer-readable medium of claim 1, wherein said sub-part of said row is an array, and wherein each member of said array is represented in said row.

3. The computer-readable medium of claim 1, wherein said index has a different index entry for each value associated with said sub-part of said row.

4. The computer-readable medium of claim 1, wherein said first data is a value that represents a position of a portion of a multidimensional cube relative to other portions of said multidimensional cube; and wherein said second data is a value that represents a position of a cell of said multidimensional cube relative to other cells within the same portion in which said cell resides.

5. The computer-readable medium of claim 1, wherein said sub-part of said row is an array, and wherein each member of said array represents a value of a cell of a multidimensional cube.

6. The method of claim 1, wherein said sub-part of said row stores data that has a complex data type.

7. A method for locating data within a relational table wherein said data is associated with a key value, the method comprising the steps of:

traversing an index that is built on said relational table to locate a first entry for said key value;

reading first data from said first entry to identify which row of a plurality of rows of said relational table contains data associated with said key value; and reading second data from said first entry to locate a first sub-part, within said row that is associated with said key value.

8. The method of claim 7, wherein said index has a second entry for a key value for a second sub-part of said row, the method further comprising the steps of:

traversing said index based on said key value associated with said second sub-part;

reading first data from said second entry to identify said row; and reading second data from said second entry to locate said second sub-part within said row.

9. A computer-readable medium carrying one or more sequences of instructions which, when executed by one or more processors, causes the one or more processors to perform the method recited in claim 8.

10. The method of claim 7, wherein said first data is a value that represents a position of a portion of a multidimensional cube relative to other portions of said multidimensional cube; and wherein said second data is a value that represents a position of a cell of said multidimensional cube relative to other cells within the same portion in which said cell resides.

11. A computer-readable medium carrying one or more sequences of instructions which, when executed by one or more processors, causes the one or more processors to perform the method recited in claim 10.

12. A computer-readable medium carrying one or more sequences of instructions which, when executed by one or more processors, causes the one or more processors to perform the method recited in claim 7.

13. An apparatus for locating data within a relational table wherein said data is associated with a key value, the apparatus comprising:

means for traversing an index that is built on said relational table to locate a first entry for said key value;

means for reading first data from said first entry to identify which row of a plurality of rows of said relational table contains data associated with said key value; and means for reading second data from said first entry to locate a first sub-part, within said row that is associated with said key value.

* * * * *

UNITED STATES PATENT AND TRADEMARK OFFICE
CERTIFICATE OF CORRECTION

PATENT NO. : 6,778,996 B2
DATED : August 17, 2004
INVENTOR(S) : Raymond Roccaforte It is certified that error appears in the above-identified patent and that said Letters Patent is hereby corrected as shown below:

Column 30,
Line 9, "method of claim" should read -- computer-readable medium of claim --.

Signed and Sealed this

Twenty-fifth Day of January, 2005

JON W. DUDAS
*Director of the United States Patent and Trademark Office*